May 6, 1941.   R. T. VON PALMENBERG   2,240,729
FITTING FOR STORE COUNTERS
Filed Aug. 25, 1938
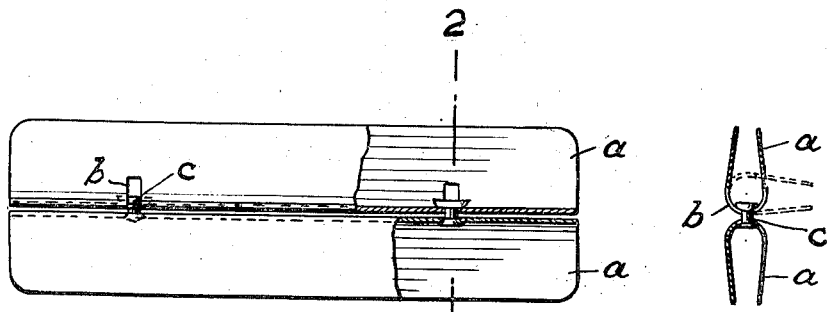
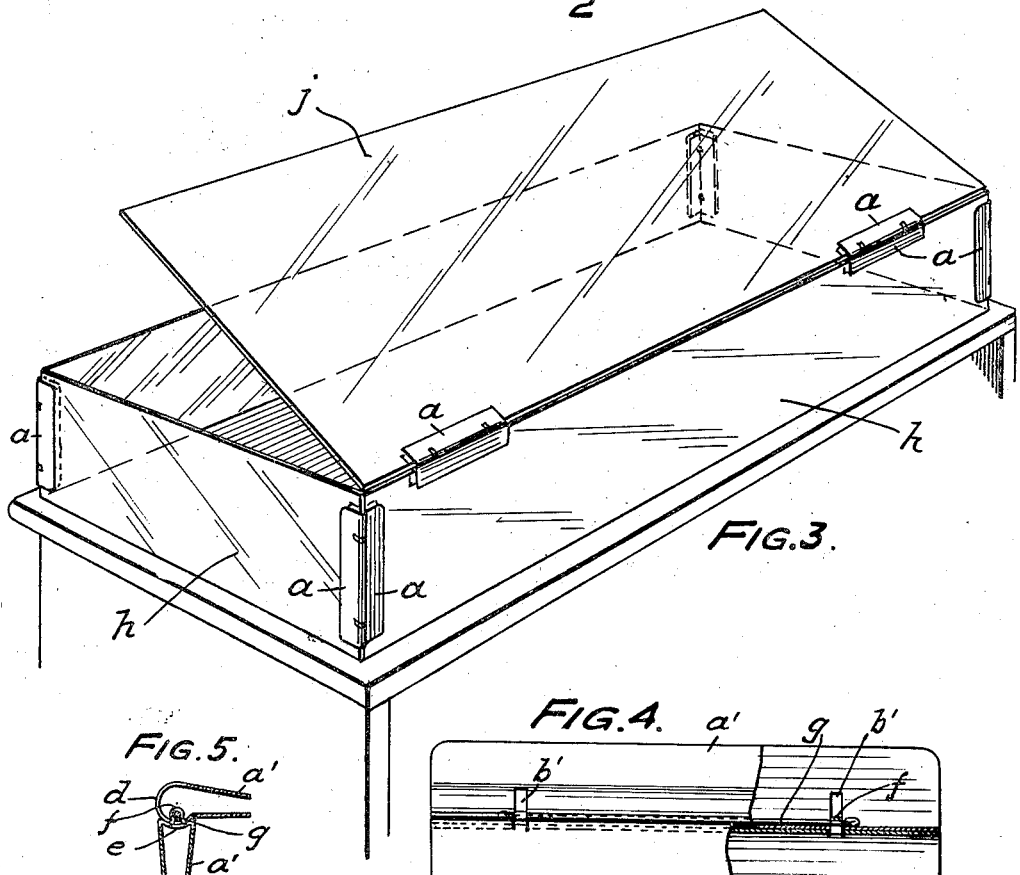
INVENTOR
Raymond T. von Palmenberg
BY
ATTORNEYS.
WITNESS:

Patented May 6, 1941

2,240,729

UNITED STATES PATENT OFFICE 2,240,729

FITTING FOR STORE COUNTERS

Raymond T. von Palmenberg, New York, N. Y.

Application August 25, 1938, Serial No. 226,659

3 Claims. (Cl. 16—167)

This invention relates to a novel fitting for store counters so constructed as to be adapted for use as a corner member for securing the adjacent ends of partition elements in the formation of bins on the counters of stores and, at the same time, as to be adapted for use as a hinge for a bin cover.

Generally speaking the fitting in accordance with this invention comprises a pair of channel members secured together in a manner such as to permit the members to be moved into various angularity one with the other or into alignment.

The fitting may be simply and economically produced and will be found of great advantage for use in the formation of bins on store counters, in that it will be readily engaged with and accommodate itself to bin forming members, such as sheets of glass, wood, or the like, and, at the same time, will accommodate itself to adjacent members meeting in misalignment or to any angle at which adjacent members may meet to form a corner. The fitting may be equally readily removed where it is desired to dismantle a bin. Again, where a covered bin is required, the fitting will be found efficient for use as a hinge for a cover.

Having now indicated, in a general way, the nature and purpose of this invention, I will proceed to a detailed description of a preferred embodiment thereof with reference to the accompanying drawing in which:

Figure 1 is a plan view of a fitting embodying this invention, partly in section and partly broken away.

Figure 2 is a sectional view on line 2—2, Figure 1.

Figure 3 is a perspective view of a counter including fittings embodying this invention.

Figure 4 is a view, similar to that of Figure 1, showing a modification of this invention.

Figure 5 is a sectional view of the fitting shown in Figure 4.

Referring to Figures 1 and 2, a, a are similar channel members. The members a, a may be formed from sheet metal to the form or form similar to that shown, for example, as in Figure 2. One of the members a is provided with a pair of transverse slots b, b in its rear on lines spaced from its ends. The members a, a are secured together by means of rivets c, c passed through the slots b, b in one of the members and through the other member, as will be clear from an inspection of Figures 1 and 2. It will now be noted that the members a, a are secured together by means of the rivets c, c and that by virtue of the passage of the rivets c, c through the slots in one of the members, the members may be moved into angular relationship with respect to one another or into alignment.

Referring now to Figures 4 and 5, in which a modification of the structure shown in Figures 1 and 2 is illustrated, the channel members a', a' are formed from sheet metal, the bottom of the channel of one of the members being rounded to a convex form, as shown at d, Figure 5, and the bottom of the channel of the other member being formed concave, as shown at e, Figure 5.

The member a' having the concave form is provided with eyes f, f formed by raising the material of the concave edge, while the member a', which is convex, is provided with slots b', b' at points corresponding to the position of the eyes f, f. When the member a', a' are brought together, the eyes f, f will extend through the slots b', b' and the members are secured together by a pintle g passing through the eyes. The modified form of fitting shown in Figures 4 and 5 will function in a manner similar to that indicated for the fitting shown in Figures 1 and 2 in that the members a', a' may be moved into various angularity one with another or in alignment.

Referring now to Figure 3, by which uses of the fitting according to this invention are illustrated, h, h represent sheets of glass arranged for formation of a bin on a counter i. Adjacent sheets of glass h, h are secured together where they meet to form a corner by entry of their end portions into the channel members of a fitting. It will be noted that the sheets of glass where they meet to form corners are securely held by engagement within the channel members, which are readily moved into the necessary angularity with respect to one another demanded by the particular corner.

Again j indicates a cover, which may be a sheet of glass, for the bin formed by the sheets of glass h, h. Fittings in accordance with this invention serve as hinges for the cover through engagement, as described, with the upper edge of one of the sheets of glass h and with an edge of the cover j. The relative movement permitted between the channel members of the fittings permits the cover j to be laid down over the bin to close it or to be raised to any desired extent.

The fittings in accordance with this invention, in addition to their adaptability for use for securing the members of a bin at the corners and as hinges, will also lend themselves to the securing of bin elements or other members in line and in such use the fittings will be found advantageous inasmuch as they will readily compensate for any misalignment of the elements.

It will be understood that it is not contemplated that this invention shall be limited to the specific structure described above in detail for purposes of illustration, since it is contemplated that various modification in detail may be made without departing from the scope of this invention.

What I claim and desire to protect by Letters Patent is:

1. A fitting comprising, in combination, a pair of channel members having arcuate bottoms, a transverse slot in the bottom of the channel of one of the members said slot extending into the walls of said member, an eye raised from the bottom of the other member and extending through said slot and a pintle within said slotted member extending through said eye.

2. A fitting comprising, in combination, a pair of channel members the sides of which converge adjacent their free ends, the bottom of the channel of one of the members being concave and the bottom of the channel of the other member being convex, a transverse slot in the bottom of the concave channel bottom of one of the members said slot extending into the walls of said member, an eye raised from the bottom of the other member and extending through said slot and a pintle within said slotted member extending through said eye.

3. A fitting comprising, in combination, a pair of channel members, the sides of which converge adjacent their free ends, said channel members respectively being adapted to engage members to be secured together, a transverse slot in the bottom of one of the channel members, said slot extending from the bottom into one of the walls of said member, means carried by the other member and adapted when said members are assembled together to extend through said transverse slot to secure said members together while permitting said members to move into various angular relationship with one another.

RAYMOND T. von PALMENBERG.